United States Patent
Mofakhami

(10) Patent No.: US 8,383,692 B2
(45) Date of Patent: Feb. 26, 2013

(54) METHOD OF ACTIVATING BORON NITRIDE

(75) Inventor: Arash Mofakhami, Buthiers (FR)

(73) Assignee: Ceram HYD, Avon (FR)

( * ) Notice: Subject to any disclaimer, the term of this patent is extended or adjusted under 35 U.S.C. 154(b) by 284 days.

(21) Appl. No.: 12/602,116

(22) PCT Filed: Mar. 6, 2008

(86) PCT No.: PCT/FR2008/050381
§ 371 (c)(1),
(2), (4) Date: Jun. 1, 2010

(87) PCT Pub. No.: WO2008/148957
PCT Pub. Date: Dec. 11, 2008

(65) Prior Publication Data
US 2010/0280138 A1 Nov. 4, 2010

(30) Foreign Application Priority Data
May 28, 2007 (FR) .................................. 07 55287

(51) Int. Cl.
*C01B 21/064* (2006.01)
(52) U.S. Cl. .......... 521/27; 423/290; 205/638; 429/492; 524/404
(58) Field of Classification Search .......... 521/27; 423/290; 524/404; 205/638; 429/492
See application file for complete search history.

(56) References Cited

U.S. PATENT DOCUMENTS

| | | | |
|---|---|---|---|
| 4,146,446 A | 3/1979 | Von Sturm | |
| 4,737,249 A | 4/1988 | Shepard, Jr. et al. | |
| 4,795,617 A * | 1/1989 | O'Hare | 422/186.15 |
| 5,205,911 A | 4/1993 | Kawolics et al. | |
| 5,270,126 A * | 12/1993 | Aoki | 429/484 |
| 5,935,727 A | 8/1999 | Chiao | |
| 6,306,358 B1 | 10/2001 | Yamamoto | |
| 6,864,011 B2 | 3/2005 | Kawahara et al. | |
| 2002/0100682 A1 | 8/2002 | Kelley et al. | |
| 2004/0140201 A1 | 7/2004 | Horikawa | |
| 2005/0016866 A1 | 1/2005 | Kramer et al. | |
| 2005/0072334 A1 | 4/2005 | Czubarow et al. | |
| 2006/0194096 A1 | 8/2006 | Valle et al. | |
| 2006/0237688 A1 | 10/2006 | Zimmerman | |
| 2007/0119718 A1 | 5/2007 | Gibson et al. | |

(Continued)

FOREIGN PATENT DOCUMENTS

| EP | 1 400 986 A1 | 3/2004 |
|---|---|---|
| FR | 2 871 478 A1 | 12/2005 |

(Continued)

OTHER PUBLICATIONS

Kojima, Y., et al., "Hydrogen storage of metal nitrides by a mechanochemical reaction," Journal of Power Sources, 159, (2006), pp. 81-87.

(Continued)

*Primary Examiner* — Peter D. Mulcahy
*Assistant Examiner* — Henry Hu
(74) *Attorney, Agent, or Firm* — O'Brien Jones, PLLC

(57) ABSTRACT

A method of activating boron nitride comprises exposing the boron nitride to a fluid enabling —OH hydroxyl radicals and/or $H_3O^+$ to be delivered and creating B—OH bonds and/or $NH_2$ bonds in the boron nitride, and eliminating the fluid and recovering the activated boron nitride.

16 Claims, 2 Drawing Sheets

U.S. PATENT DOCUMENTS

Figure 5:
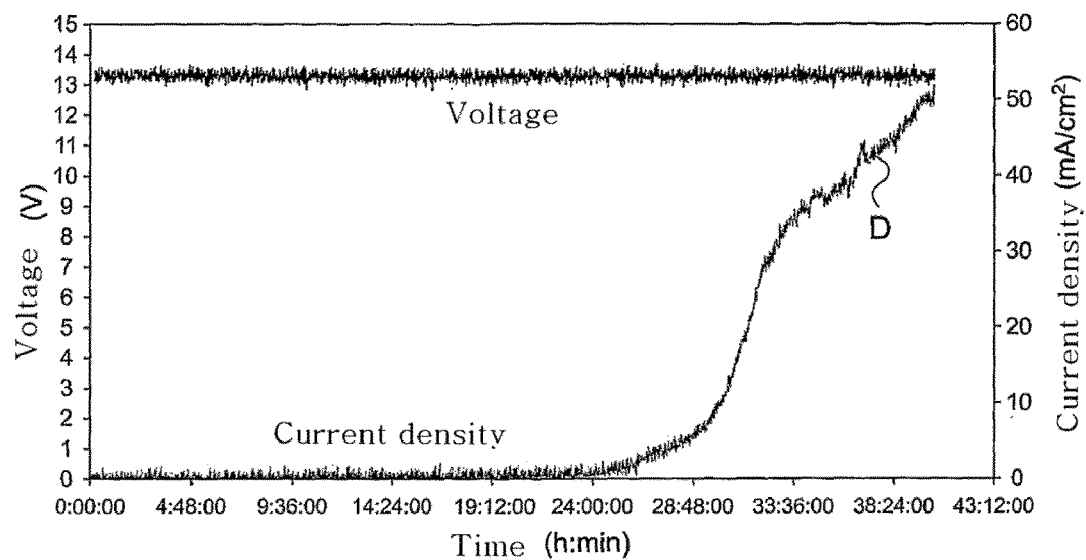

| | | | |
|---|---|---|---|
| 2007/0178384 A1 | 8/2007 | Kajita et al. | |
| 2008/0160359 A1 | 7/2008 | Mofakhami | |
| 2010/0089767 A1* | 4/2010 | Mofakhami | 205/638 |
| 2010/0279201 A1 | 11/2010 | Mofakhami | |
| 2010/0280138 A1 | 11/2010 | Mofakhami | |
| 2011/0091789 A1 | 4/2011 | Mofakhami et al. | |

FOREIGN PATENT DOCUMENTS

| | | | |
|---|---|---|---|
| FR | 2 916 906 A1 | 12/2008 | |
| WO | 96/07623 A1 | 3/1996 | |
| WO | 00/45457 A2 | 8/2000 | |
| WO | 02/41432 A1 | 5/2002 | |
| WO | 03/062152 A1 | 7/2003 | |
| WO | WO 2004/067611 A1 | 8/2004 | |
| WO | WO 2005/005691 A1 | 1/2005 | |
| WO | 2006/003328 A1 | 1/2006 | |
| WO | WO 2008/129182 A2 | 10/2008 | |
| WO | 2008/148956 A1 | 12/2008 | |
| WO | WO-2008/148956 A1 * | 12/2008 | |
| WO | WO-2008/148957 A1 * | 12/2008 | |
| WO | WO 2009/115732 A1 | 9/2009 | |

OTHER PUBLICATIONS

International Search Report in PCT/FR2008/050381 having a mailing date of Sep. 12, 2008.
Written Opinion of the International Searching Authority in PCT/FR2008/050381.
International Search Report in PCT/FR2008/050380 having a mailing date of Sep. 11, 2008.
Written Opinion of the International Searching Authority in PCT/FR2008/050380.
International Search Report for International Patent Application No. PCT/FR2009/050352 dated Aug. 26, 2009.
Written Opinion of the International Searching Authority for International Patent Application No. PCT/FR2009/050352 dated Aug. 26, 2009.
International Search Report for International Patent Application No. PCT/FR2008/050379 dated Jan. 22, 2009.
Written Opinion of the International Search Authority for International Patent Application No. PCT/FR2008/050379 dated Jan. 22, 2009.
Office Action dated May 3, 2012 from U.S. Appl. No. 12/529,292.
Office Action dated Oct. 3, 2012 from U.S. Appl. No. 12/529,292.
Response to Office Action dated May 3, 2012 from U.S. Appl. No. 12/529,292.
Restriction Requirement dated Apr. 26, 2012 from U.S. Appl. No. 12/602,135.
Response to Restriction Requirement dated Apr. 26, 2012 from U.S. Appl. No. 12/602,135.
Office Action dated Aug. 8, 2012 from U.S. Appl. No. 12/602,135.
Office Action dated Dec. 9, 2011 from U.S. Appl. No. 12/920,588.
Office Action dated Sep. 14, 2012 from U.S. Appl. No. 12/920,588.
Response to Office Action dated Dec. 9, 2011 from U.S. Appl. No. 12/920,588.

* cited by examiner

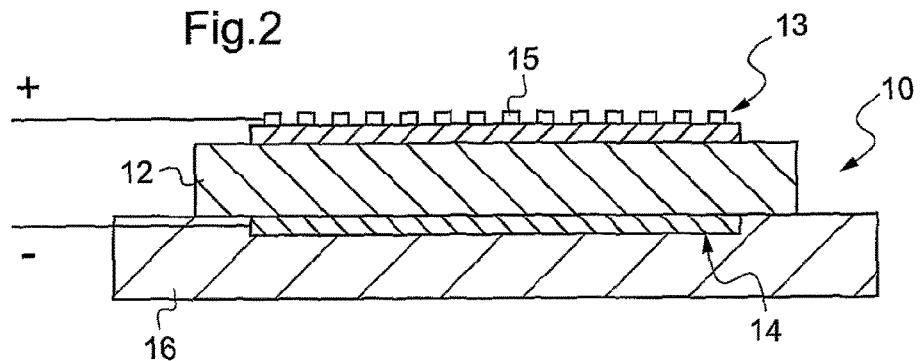
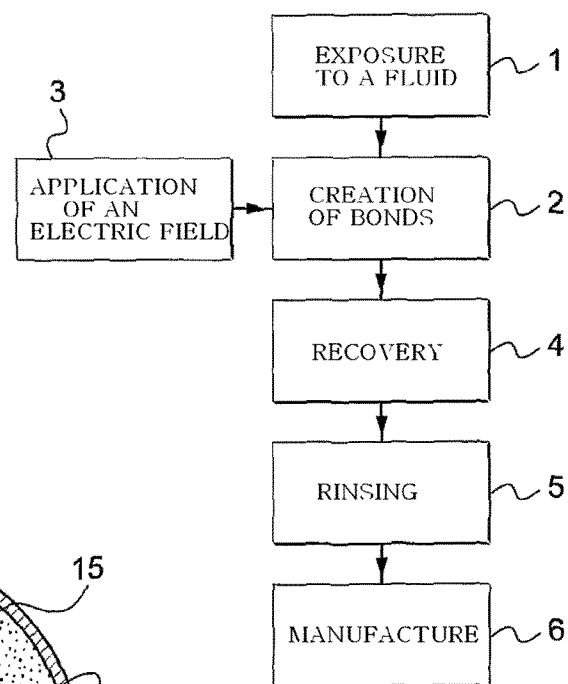
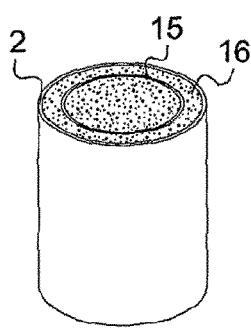
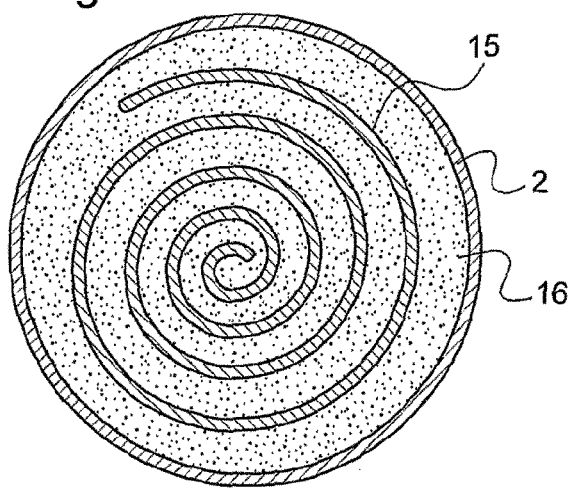

METHOD OF ACTIVATING BORON NITRIDE

This is a national stage application of PCT/FR2008/050381, filed internationally on Mar. 6, 2008, which claims priority to French Application No. FR 07 55287, filed in France on May 28, 2007.

The present invention relates to the making of activated boron nitride, and more particularly to activated boron nitride used in fuel cells, to an electrolyzer or accumulator.

WO 2006/003328 discloses the use of a boron nitride ceramic for achieving collision between protons and electrons and storing hydrogen.

The invention notably aims at proposing a method for activating boron nitride with which proton conduction of this material may be improved, which is advantageous, notably in the case when the latter is used in the making of a fuel cell, an electrolyzer or an accumulator.

Thus, the object of the invention according to one of its aspects, is a method for activating boron nitride, including the following steps:
  i) exposing boron nitride to a fluid enabling $H_3O^+$ ions and/or —OH hydroxyl radicals to be provided and creating B—OH bonds and/or NH bonds in the boron nitride,
  ii) eliminating the fluid and recovering the activated boron nitride.

A proton may easily be grafted on the oxygen of the hydroxyl and/or on the nitrogen of NH, so that proton conduction of boron nitride is improved.

By activation of boron nitride, is meant a method with which proton conduction may be promoted in boron nitride. In entirely activated boron nitride, the number of formed B—OH and NH bonds is sufficient to allow displacement of a proton from a doublet available on the oxygen of a B—OH group or on the nitrogen of a NH group to another neighboring doublet, successively forming the $NH_2^+$ and $BOH_2^+$ groups.

Conduction of the protons may further be carried out by means of doublets available on oxygen atoms inserted into nitrogen vacancies of boron nitride. Such nitrogen vacancies containing oxygen atoms may notably be present when boron nitride has been obtained from $B_2O_3$ or from $H_3BO_3$.

The activated boron nitride may then be used for making a fuel cell, an electrolyzer or an accumulator.

The fluid may be a solution. The fluid may for example be an acid solution containing $H_3O^+$ ions, for example strong acids such as HCl, $H_2SO_4$, $H_3PO_4$ or weak acids or it may further not be an acid solution, but for example a basic solution containing OH- ions, for example a soda, potash solution. The concentration of the solution may have an influence on the activation rate and level obtained, i.e. on the level of obtained proton conductivity, but not on the occurrence of the actual activation. The acid concentration may for example be comprised between 1 and 5 mol/L and the concentration of soda may be comprised between 0.5 and 1 mol/L. The pH may for example be 1.

The fluid used may further be simply water.

In this case for example, iron, for example as an iron grid, may also be immersed in the fluid and the whole may be subject to an electric field in order to promote creation of iron oxide and OH- ions.

The fluid may be a gas, for example steam brought to a high temperature, for example of the order of 300° C.

The fluid may further be biphasic, for example appearing as fog.

In order to promote creation of B—OH and $NH_2$ bonds, the boron nitride and the fluid may be subject to an electric field, for example an electric field comprised between 15 and 40,000 V/m, or even of the order of 15,000 V/m. A field of 15,000 V/m is equivalent to applying a voltage of 1.5 V for a boron nitride thickness of 100 µm or further 15 V for a thickness of 1 mm.

The applied voltage may for example be comprised between 1.5 V and 50 V, for example of the order of 30 V. The voltage source may be constant, or alternatively not be constant. It may be configured in order to detect the end of the activation automatically, for example when the current density in the boron nitride suddenly increases. The intensity of the current flowing during the activation in the boron nitride may be of the order of 10 mA/cm2 to 1000 $mA/cm^2$.

The electric field may be generated by an external generator.

The electrodes used, cathode and anode, may for example be in platinum. The shape of the electrodes may for example be planar or alternatively non-planar. They may for example appear as grids. The electrodes may be oriented vertically or alternatively non-vertically, for example either horizontally or not.

With the presence of an electric field, for example the natural hydrophobicity of boron nitride may be overcome. Dihydrogen may be produced at the cathode during activation, and then dioxygen at the anode. Dihydrogen and dioxygen formed at the anode and at the cathode may be recovered in tanks.

The fluid may be forced to flow on either side of the boron nitride, for example by means of a pump.

The activation by a fluid may be carried out at a temperature comprised between 0 and 90° C., for example of the order of 60° C., or even at room temperature.

The activation by a gas such as steam may for example be carried out in a closed chamber in the following way: the boron nitride is brought to a temperature of 600° C. with neutral gas sweeping, i.e. out of the presence of oxygen and water. The boron nitride may then be cooled from 600° C. to room temperature by then being subject to sweeping with air saturated with humidity at a controlled temperature.

The boron nitride may be activated in a soda solution, with or without applying an electric field.

The boron nitride may be crystallized in a hexagonal form.

The method may be applied in an alternative embodiment with turbostratic boron nitride, i.e. the crystallization plans of which may be slightly shifted relatively to the theoretical crystallization position, for example hexagonal crystallization of boron nitride, which leads to a shift in the stacking of the planes and to planes between them not being so well maintained, the latter being slightly more spaced apart.

The activation of boron nitride may further be promoted when the latter appears in a powdery form, for example as grains of small size, i.e. of the order of a few micrometers. The grains may for example have an average size larger than 1 nm, or even larger than 10 nm, or even larger than 5 µm and less than 20 µm, or even of the order of 10µ. The grains may themselves consist of crystallites of an average size comprised between 0.1 and 0.5 µm.

When the boron nitride appears as a layer, the grains of boron nitride may preferably be oriented not all parallel to the layer, but for example perpendicularly to the latter, so as to ensure better mechanical strength, or even heterogeneously in order to ensure better proton conduction.

The boron nitride may include percolated boron nitride grains, for example maintained firmly attached to each other by a compound, for example a compound from the following list: nickel, boron oxide, calcium borate, ethylcellulose, boric acid, polyvinyl alcohol, vinyl caprolactam, PTFE (Teflon®), sulfonated polyethylsulfone.

The boron nitride may be activated in its powdery form before insertion in a binder, for example in a polymer, or further after insertion in this binder, for example depending on the binder used. The boron nitride may be inserted, for example in a powdery form, in a polymeric membrane, which may provide it with very good proton conductivity, for example a ion-conducting polymer, and more generally any ion exchanging material.

The boron nitride used may be associated with one or more of the compounds of the following list: polymer, ion-conducting polymer, PVA, boric acid.

The boron nitride used may be incorporated into a polymeric membrane before activation. Alternatively, the activated boron nitride may be inserted into a binder, for example boric acid or a polymeric membrane, before being used for making a fuel cell, an electrolyzer or an accumulator. Incorporation may be performed before polymerization or after polymerization and before extension or molding.

The polymer may for example be PVA, polyvinyl alcohol, vinylcaprolactam, PTFE, sulfonated polyether sulfone.

The boron nitride may appear as grains, for example with an average size comprised between 5 and 15 µm, or even between 7 and 11 µm. The mass proportion of boron nitride in the material may be comprised between 5% and 100%, for example up to 70%. The layer may entirely be made of high pressure sintered boron nitride powder. Alternatively, it may include boron nitride and a binder, being made by an HIP (Hot Isostatic Pressure) process.

When the boron nitride appears as a membrane, the thickness of this membrane may be comprised between 0.05 and 5 mm. The surface area of the membrane subject to activation may be comprised between 0.5 cm$^2$ and 1 m$^2$.

The polymer, for example PVA, may be used for blocking the present porosities in boron nitride. Adding the polymer may for example be carried out in vacuo, so that the latter is sucked into the porosities of the boron nitride.

The boron nitride before or after activation may be associated with one or more of the compounds of the following list, which is non-limiting: an inorganic compound, for example silica, for example as Aerosil®, pyrogenated amorphous silica, organic silica with a thiol group, silica with a phosphonic acid function, silica with sulfonic acid anchored at the surface, alumina, zirconia, sulfated zirconia, titanium oxide, sulfonated titanium oxide, tungsten trioxide, tungsten trioxide hydrate, heteropolyacid, for example polytriacetylene (PMA), polymethacrylic acid (PMA), STA, SMA, tungstophosphoric acid (TMA), molybdophosphoric acid (MBA), disodium tungstophosphoric acid salt (NA-TPA), phosphomolybdic acid (PMA), lacunar heteropolyacid $H_8SiW_{11}O_{39}$, functionalized sulfonic heteropolyacid, PWA, silico-tungstic acid, PTA supported on $SiO_2$, $ZrO_2$ and $TiO_2$, MCM-41-loaded heteropolyacid, mesoporous tungsten silicate material SI-MCM-41, Y-zeolite-loaded heteropolyacid, silico-tungstic acid, zirconium phosphate, zirconium sulfophenyl phosphate (ZRSPP), hydrogenated zirconium phosphate $Zr(HPO_4)_2$, zirconium tricarboxybutyl phosphonate, zirconium sulfophenylene phosphonate, $Zr(HPO_4)_{10}(O_3PC_6H_4SO_3H)_{10}$, zirconium phosphate sulfophenylene phosphonate, sulfonated zirconium phosphate, cesium salt of silico-tungstic acid, multilayer silicate nanoparticles, for example montmorillonite, laponite, modified montmorillonite, for example sulfonated montmorillonite, MCM-41, organic montmorillonite (OMMT), montmorillonite grafted with organic sultones and perfluorinated sultones, phosphosilicates ($P_2O_5$—$SiO_2$), phosphato-antimonic acid, noble metals, for example platinum, ruthenium, platinum silicate coated with Nafion®, silver, zeolite, chabasite and clinoptylolite, mordonite, phosphate, calcium phosphate, calcium hydroxyphosphate, boron phosphate, organic compound, polymer, Nafion® (Dupont de Nemours), perfluorosulfonic acid, sulfonated polysulfone, PEO, polyaniline, poly(vinylidene)fluoride-chlorotetrafluoroethylene, PEG, DBSA, 4-dodecylbenzene sulfonic acid, SEBSS (sulfonated styrene, sulfonated styrene-(ethylene-butylene)), PVA, glutaraldehyde, krytox, diphenylsilicate, diphenyldimethoxysilicate, sulfonated poly(ethersulfone), PVDF, Nafion® NRE-212 membrane, $Cs_{2.5}H_{0.5}$, $PWO_{40}$, PVDF-G-PSSA, polyvinylidene fluoride, polyacrylonitrile, dodeca-tungstophosphoric acid, sulfonated (poly)etheretherketone (SPEEK), PVA, PEO, sulfonated poly(arylene-ethersulfone), polyvinyl alcohol, PEEK (s-polyetheretherketone), sulfonated polyethersulfone cardo, polyphenylene oxide (PPO), polyethylene glycol, silica nanoparticles, divacant tungstosilicate $[\gamma-SiW_{10}O_{36}]^{8-}$, PWA, PBI, PEG, polyethylenimine (PEI), disulfonated poly(arylene-ethersulfone), Teflon®, sulfonated divinylbenzene (crosslinked DVB), poly(ethylene-alt-tetrafluroroethylene) grafted with polystyrene, poly(vinyl difluoride), polybenzimide azole, PVDF, sulfonated poly(etheretherketone) cardo, poly(fluorinated arylene-ether)s, Nafion® 115, polyimide, polyamidimide (PAI), polyvinylidene fluoride (PVDF), styrene-ethylene-butylene-styrene elastomer (SEBS), poly (sulfonated biphenylethersulfone), polytetrafluoroethylene (PTFE), PBI.

A membrane containing 99 to 100% of boron nitride may be obtained by the following method.

Boron nitride grains are mixed with a polymeric binder in liquid form, this mixture being poured or screen-printed or further printed according to the desired thicknesses of layers on a substrate, and then heated to a sufficient temperature so as to cause calcination of the binder, for example at a temperature of the order of 600 or 700° C., so that the boron nitride grains are percolated through each other on the substrate, i.e. they touch each other.

In an additional step, the obtained result is heated to a temperature comprised between 800 and 1,700° C., or even between 1,000 and 1,500° C. under a neutral atmosphere, for example of nitrogen or argon, causing sintering of the grains with each other.

Finally, in an additional step, the substrate is removed and a rigid boron nitride membrane consisting of sintered grains is obtained.

Finally, the activation may be promoted when the boron nitride used has at least one, for example one or more additives from the following list: oxygen, boron oxide, calcium borate, boric acid.

The additives may promote activation when they are present in a mass portion comprised between 1 and 10%.

The presence of boric acid, for example present in the porosities of the boron nitride may favorably allow creation of B—OH bonds.

The activated boron nitride may be rinsed, and then possibly dried before using it for making a fuel cell, an electrolyzer or an accumulator.

In order to rinse the activated boron nitride, water, acetone or ethanol may be caused to flow in the place of the fluid in the absence of any electric field and heating.

The fluid may be eliminated so that its residual content within the activated boron nitride is less than 5%.

The step of exposure to the fluid may have a duration of more than 3 hours, for example comprised between 10 and 50 hours, or even between 15 and 45 hours, better between 20 and 72 hours for example.

Figure 6:
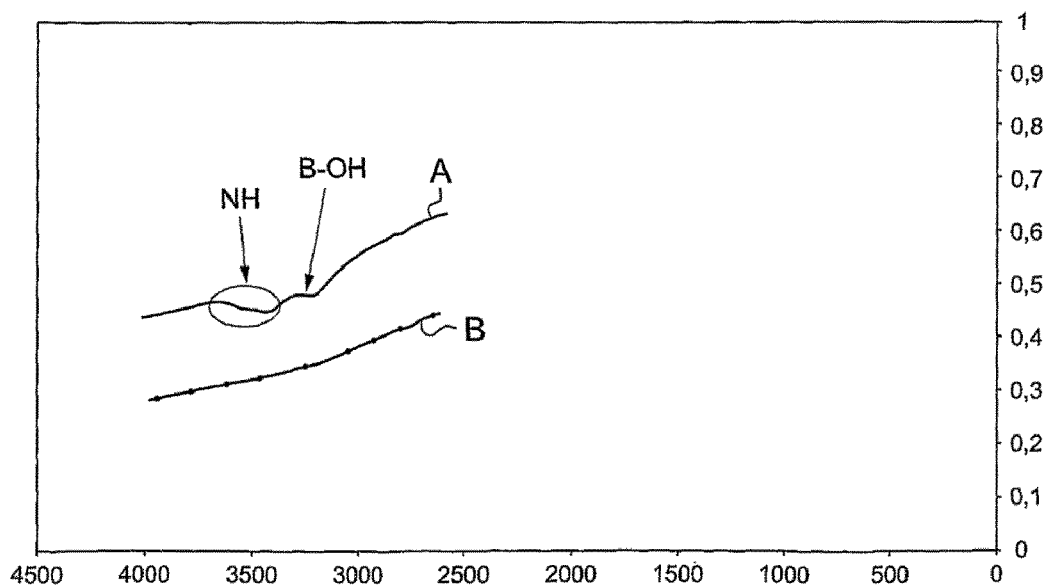

The invention may be better understood upon reading the detailed description which follows of a non-limiting exemplary embodiment thereof, and upon examining the appended drawing, wherein:

FIG. 1 is a block diagram illustrating the method according to the invention,

FIG. 2 is a schematic and partial view of a fuel cell including activated boron nitride according to the invention, FIG. 3 is a perspective, schematic and partial view of a device for activating boron nitride, FIG. 4 is a top, schematic and partial view of an alternative device for activating boron nitride, FIG. 5 illustrates the current density variation during the activation of a membrane, and FIG. 6 illustrates the infrared spectra of activated boron nitride and of crude boron nitride.

On the drawing, the relative proportions of the various components have not always been observed, for the sake of clarity.

An exemplary activation method according to the invention will now be described with reference to FIG. 1.

Boron nitride is used, which may be hexagonal, or even turbostratic hexagonal, and which appears in an embodiment of the invention in a powdery form. The activation may be facilitated by this. The boron nitride gains may be percolated. The boron nitride may have at least one impurity which may promote activation.

The selected boron nitride is in a first step 1, exposed to a fluid allowing $H_3O^+$ ions and/or —OH hydroxyl radicals, for example an acid or basic solution, to be provided, or even quite simply water.

The powdery boron nitride may be positioned in a crucible itself made in boron nitride, in order to ensure proton conductivity, or in another material.

In a second step 2, bonds are created between the boron nitride and the hydroxyl radical, notably B—OH bonds, and/or bonds are created with the nitrogen atoms of boron nitride, in order to form N—H bonds.

The activation may be promoted by involving an electric field, for example by means of a cathode and an anode dipped in the solution, one of both of these electrodes may be used and kept subsequently for making the fuel cell.

After activation, in a step 4, the activated boron nitride is recovered, which may optionally be rinsed in a step 5, before proceeding with making a fuel cell, an electrolyzer or an accumulator, in a step 6.

The boron nitride used may further be associated with a binder, for example a polymer, before activation or after activation, and before making the fuel cell, in order to make a proton exchange membrane by means of this binder and of activated boron nitride.

A fuel cell 10 including a proton exchange membrane 12 formed with activated boron nitride according to the invention is schematically and partly illustrated in FIG. 2. In the described example, this is an activated h-BN hexagonal boron nitride ceramic. The fuel cell 10 includes an anode 13 on one side of the proton exchange membrane 12 and a cathode 14 on the other side of the latter.

The anode 13 for example includes a layer which is used for the oxidization reaction, for example a metal compound such as platinum or gold, or a composite such as platinum-graphite or gold-graphite, and the cathode 14 a layer of a catalyst for the fuel, for example a layer of platinum, nickel, nickel-graphite, or platinum-graphite, each layer may be in contact with the membrane 12.

The proton exchange membrane 12 as well as the two layers positioned on either side of the latter, may be supported by a porous and inert substrate 16, such as for example a porous layer of alumina, zirconia, or boron nitride.

Electric conductors may contact the anode 13 and the cathode 14.

The anode 13 may for example include on the layer used for the oxidization reaction a gold deposit, for example as a grid 15, in order to collect the electric current.

The thickness of the exchange membrane 12 is for example 100 μm and that of the layers used for the oxidization and catalyst reaction for example ranges from 10 to 30, and 100 μm.

In an exemplary embodiment of the invention, the proton exchange membrane 12 is made from an h-BN boron nitride ceramic of reference HIP from SAINT-GOBAIN, activated by exposure to an acid, for example sulfuric acid.

Exposure to the acid may be carried out for example for several hours, the sulfuric acid for example having a concentration of 0.1M to 5M, for example 5M. During this exposure, the membrane may if necessary be exposed to an electric field of about 30, 000 V/m, i.e. to a voltage of 30 V when the thickness of the membrane is 1 μm, which may improve the quality of the activation. The ceramic is rinsed after exposure to the acid. Without being bound to a theory, with the activation it is possible to modify the pending bonds of the grains of the boron nitride.

When the membrane is activated in the presence of electric field, this electric field may be generated between two electrodes. The anode may either be in contact with the membrane or not and be in contact with the acid electrolyte and water. The cathode should only be in contact with the membrane and not in contact with the acid.

Alternatively, the cathode may itself also be immersed in the acid in a cathode compartment. In this case, there are two compartments an anodic and cathodic compartment, sealably separated by the membrane. Each compartment contains acid and the electrodes are either in contact with the membrane or not.

Still alternatively, the boron nitride may be deposited as a powder in a crucible 2 into which the cathode 15 is also inserted, as illustrated in FIG. 3. The crucible may be made in boron nitride, in order to promote activation. The assembly is then immersed into the electrolyte.

In a further alternative, the cathode 15 may have a spiral shape, as illustrated in FIG. 4.

These may be electrodes only used for the activation process and not useful subsequently, for example not found again in the system using the membrane. These may also be electrodes, one of which is found in the final system, notably the cathode for example.

At least one of the electrodes used for activation, or even both, may be in contact with the membrane and be for example permanently attached to the latter. One of the electrodes used for activation is for example a platinum anode; other electrically conducting components may be used subject to that they do not oxidize or degrade rapidly.

The anode may further be in porous platinum if the latter is in contact with the membrane. The other electrode, also porous, is a cathode in any electrically conducting material. These electrodes may for example be flattened against the membrane by thin layer deposition processes.

Of course, there is no departure from the scope of the present invention by providing modifications to the examples which have just been given above.

It is notably possible to coat the exchange membrane with platinum, nickel or an alloy of these two metals only on the anode and to use a porous titanium plate as a current collector. It is also possible to only coat the exchange membrane on the anode with an alloy of oxides, $RuO_2$, $IrO_2$, $SnO_2$ or $TiO_2$ and to only use a porous titanium plate as a current collector. The other face corresponding to the cathode is for example made conductive by depositing a metal such as copper or silver lacquer.

The proton exchange membrane may have various shapes, for example a planar or cylindrical shape.

The proton exchange membrane 12 may be used within an electrolyzer including a metal cathode, for example in platinum or other electrical conductors, the anode for example also being in platinum.

Still alternatively, the exchange membrane 12 may be used within an accumulator, the anode being for example made in platinum or nickel and in contact with an aqueous acid electrolyte, for example a sulfuric acid solution, while the cathode includes a hydridable material.

The result of the activation on the boron nitride will now be described with reference to FIGS. 5 and 6.

The change in the current density and voltage during activation of the boron nitride is illustrated in FIG. 5. It is seen that the current density D suddenly increases after a certain time, i.e. about thirty hours in the described example, which illustrates the fact that proton conduction in the boron nitride is ensured.

The infrared spectra of the activated boron nitride A and of the crude boron nitride B, i.e. before activation, are illustrated in FIG. 6.

It is seen upon observing these spectra A and B that they are of different shapes. The presence of two troughs on the spectrum A which are present on the spectrum B may be noted. These troughs illustrate the presence of B—OH and N—H bonds, which result from activation of the boron nitride.

Activation of the boron nitride may also be seen by measuring the proton conductivity of the latter. Crude boron nitride, i.e. non-activated, may have a proton conductivity of the order of $10^{-5}$ Siemens/cm, while activated boron nitride may have a proton conductivity of the order of $10^{-3}$ to $10^{-2}$ Siemens/cm, for example $5.10^{-3}$ Siemens/cm.

As a comparison, Nafion® may have proton conductivity of the order of 0.1 to 1 Siemens/cm.

The expression <<including one>> should be understood as being a synonym of <<including at least one>>.

The invention claimed is:

1. A method for activating boron nitride, the method comprising:

exposing the boron nitride to a fluid enabling —OH hydroxyl radicals and/or $H_3O^+$ ions to be provided and creating B—OH bonds and/or $NH_2$ bonds in the boron nitride; and eliminating the fluid and recovering the activated boron nitride, wherein the fluid is an acid solution or a basic solution.

2. The method according to claim 1, further comprising subjecting the boron nitride and the fluid to an electric field.

3. The method according to claim 1, wherein iron is further immersed in the fluid.

4. The method according to claim 1, wherein the fluid is a gas.

5. The method according to claim 1, wherein the boron nitride is crystallized in hexagonal form.

6. The method according to claim 1, wherein the boron nitride is turbostratic.

7. The method according to claim 1, wherein the boron nitride is in a powdery form.

8. The method according to claim 1, wherein the boron nitride comprises percolated grains of boron nitride.

9. The method according to claim 1, wherein the boron nitride has at least one additive from the following list: oxygen, boron oxide, calcium borate, boric acid.

10. The method according to claim 1, wherein the boron nitride is associated with at least one of a polymer, ion-conducting polymer, PVA, and boric acid.

11. The method according to claim 1, wherein the boron nitride is inserted into a polymeric membrane before activation.

12. The method according to claim 1, wherein the activated boron nitride is incorporated into a polymeric membrane before being used for making a fuel cell, an electrolyzer or an accumulator.

13. The method according to claim 1, further comprising rinsing the activated boron nitride.

14. The method according to claim 1, wherein exposing the boron nitride to the fluid comprises exposing the boron nitride to the fluid for a duration ranging from 10 hours to 50 hours.

15. The method according to claim 1, wherein the eliminating the fluid comprises eliminating the fluid to a residual content within the activated boron nitride of less than 5%.

16. The method according to claim 1, wherein exposing the boron nitride to the fluid comprises exposing the boron nitride to the fluid for a duration ranging from 15 hours to 45 hours.

* * * * *